April 1, 1958     J. G. POSTMUS     2,828,766
WATER MIXING UNIT
Filed Jan. 31, 1955
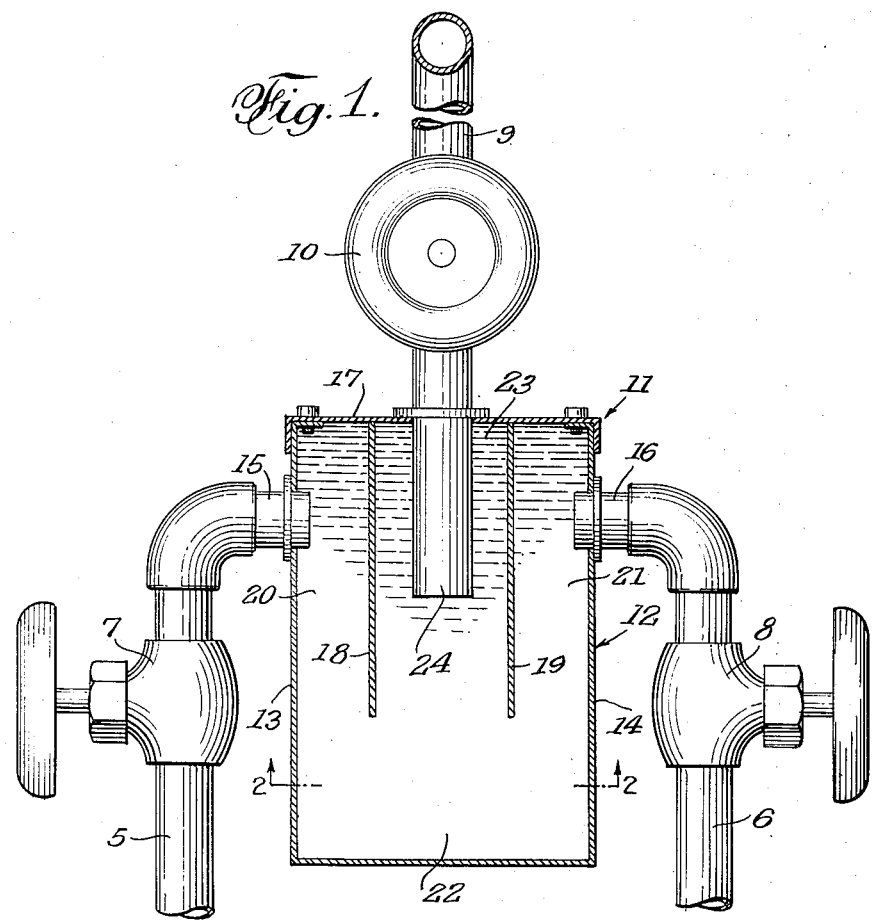
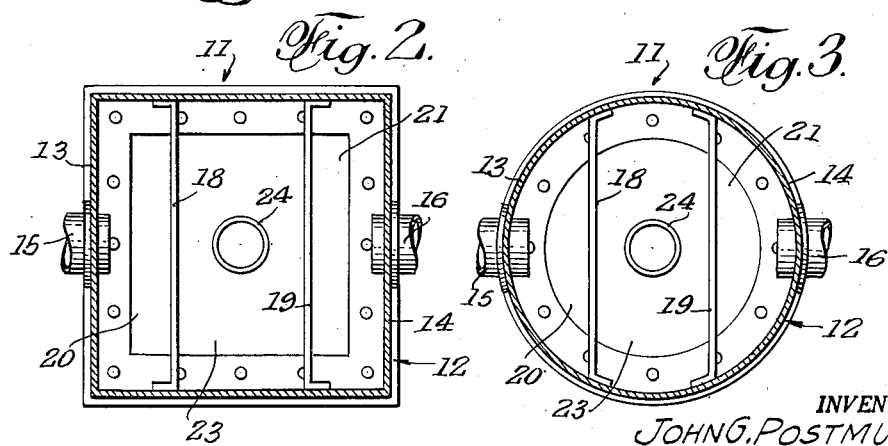
INVENTOR.
JOHN G. POSTMUS
BY C. F. Stratton
ATTORNEY United States Patent Office 2,828,766
Patented Apr. 1, 1958

2,828,766
WATER MIXING UNIT
John G. Postmus, Los Angeles, Calif.
Application January 31, 1955, Serial No. 484,874
5 Claims. (Cl. 137—574)

This invention relates to means for mixing two flows of liquid, such as water, to provide a flow that is a mixture of said two flows.

An object of the present invention is to provide a unit that is adapted to be interposed between the hot and cold water supply pipes of a bath or the like and the outlet thereof, the unit embodying simplified and improved means for providing water at a desired temperature that is a modification of the extremes of temperature of the supply water. While having general application for mixing liquids, the present invention is more particularly adapted for regulating the temperature of shower bath water.

Another object of the invention is to provide a unit of the character referred to that insures thorough intermixing of the hot and cold water to, thereby, provide for uniformity of temperature of the outlet flow.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes preferred embodiments of the present invention, which are given by way of illustration or example only.

In the drawing, like reference characters designate similar parts in the several views.

Fig. 1 is a partial elevational and partial sectional view of water mixing means according to the present invention.

Fig. 2 is a cross-sectional view as taken on line 2—2 of Fig. 1 and looking in the direction of the arrows.

Fig. 3 is a similar sectional view of a modification.

In Fig. 1 there is shown two supply pipes 5 and 6 provided with the respective flow-controlling valves 7 and 8. Said view also shows a pipe 9 that may mount a shower head or may merely comprise a flow outlet or nozzle. Pipe 9 may also be provided with a flow-controlling valve 10, although the same may be omitted and flow control achieved through manipulation of valves 7 and 8.

According to the invention, a mixing unit 11 is provided, the same receiving flow from pipes 5 and 6, as controlled by valves 7 and 8, and discharging into pipe 9.

The unit 11 that is illustrated comprises a housing 12 into the opposite sides 13 and 14 of which the respective pipes 5 and 6 discharge. Said pipes are provided with respective ends 15 and 16 that connect to said sides 13 and 14 adjacent the upper end 17 of the unit. Said end 17 may be in the form of a closure cap for the housing 12.

The unit 11 further includes a pair of transversely spaced partitions or baffles 18 and 19 that are preferably parallel and are arranged to stand across the inlet flow from the respective pipe ends 15 and 16. Thus, it will be clear that the flow from pipes 15 and 16 impinges, respectively, against baffles 18 and 19 and said flow, therefore, having turbulence or swirl imparted thereto by said baffles.

The baffles 18 and 19 are in flow-stopping contact with closure end 17 but are terminated at their lower edges considerably short of the housing bottom. Therefore, the flow from pipes 15 and 16, after striking baffles 18 and 19, can pass only in a downward direction below said baffles. It will be clear that the flow from chambers 20 and 21, thus provided, will intermix in chamber 22, occupying the bottom portion of housing 12 below the baffles. The baffles define a fourth chamber 23 therebetween, the same receiving the flow of the intermixed water moving upwardly from mixing chamber 22.

The pipe 9 is provided with a lower extension 24 that is directed, through closure end 17, into chamber 23, the same terminating substantially above the lower edges of baffles 18 and 19. Thus, while the water is turbulent in chamber 22, the pipe end 24 draws water from chamber 23 in which the turbulence has been materially reduced and largely eliminated. For this reason, the flow in pipe 9 has a modified temperature that is between the temperatures of the water flowing into the unit 11 and the same remains constant until there is a change in the setting of valves 7 and 8 or a change in the temperatures of the water in pipes 5 and 6.

As can be seen from Figs. 2 and 3, the unit 11 may have a rectangular or round shape, as viewed in plan. The same may be exposed to view or concealed in a wall, as desired. Also, the drawing shows the device in simple form, but it will be realized that fittings, unions, and other well-known piping parts may be employed to facilitate assembly.

While the foregoing has illustrated and described what are now contemplated to be the best modes of carrying out the invention, the construction is, of course, subject to modification without departing from the spirit and scope of the invention. It is, therefore, not desired to restrict the invention to the particular forms of construction illustrated and described, but to cover all modifications that may fall within the scope of the appended claims.

Having thus described the invention, what is claimed and desired to be secured by Letters Patent is:

1. Liquid-mixing apparatus comprising a housing, two partitions in the upper portion of said housing dividing said upper portion into three side-by-side chambers, a mixing chamber in the housing occupying the entire portion of the below the lower edges of the partitions, in common communication with said three chambers, means in the upper portion of said housing to conduct liquid to two of the three chambers, and means extending partly into the third chamber to draw liquid from said third to said three chambers, said third chamber being located between the other two chambers.

2. Liquid-mixing appaartus comprising a vertically disposed housing, two transversely spaced baffle walls in the upper portion of the housing dividing the same into three side-by-side chambers, said walls terminating above the lower portion of the housing to form therein a lower mixing chamber occupying the entire portion of the housing below the baffle walls and in communication with said three chambers, a pair of liquid inlet pipes communicating with two of said chambers and directed to impinge liquid upon the baffle walls defining the respective chambers, and a liquid outlet extending partly into the third chamber to draw liquid from said third of said three chambers, said third chamber being disposed between the two other two chambers.

3. A liquid-mixing unit comprising a housing, two transversely spaced partitions dividing the upper portion of said housing into two separate inlet chambers and an outlet chamber, said partitions terminating above the lower portion of the housing and defining a mixing chamber to receive flow from the inlet chambers and to direct flow to the outlet chamber, said mixing chamber occupying the entire lower portion of the housing, and an outlet pipe from the upper portion of the outlet chamber and extending partly into the outlet chamber.

4. Liquid-mixing apparatus comprising a vertically disposed housing, a pair of transversely spaced partitions depending downwardly from the upper end of said housing and within the upper portion of said housing, said partitions terminating above the lower portion of said housing and dividing said housing into four chambers, three of said chambers having a side-by-side relation in the upper portion of said housing and the fourth chamber being located in the lower portion of said housing and occupying all of said lower portion of the housing, a pair of liquid inlet pipes in the upper portion of said housing, each pipe being adapted to direct liquid against one of said partitions, and a liquid outlet extending partly into the upper portion of said housing, said outlet being adapted to withdraw liquid from the third of the three chambers after it has passed through the fourth chamber.

5. Liquid-mixing apparatus according to claim 4, in which the sum of the areas of the three side-by-side chambers is equal to the area of the fourth chamber and said three side-by-side chambers are coextensive with said fourth chamber.

References Cited in the file of this patent

UNITED STATES PATENTS

| | | |
|---|---|---|
| 1,105,242 | Bilyeu | July 28, 1914 |
| 1,385,179 | Liska | July 19, 1921 |
| 2,511,291 | Mueller | June 13, 1950 |

FOREIGN PATENTS

| | | |
|---|---|---|
| 470,739 | France | 1914 |